(12) United States Patent
Deng et al.

(10) Patent No.: US 10,252,353 B2
(45) Date of Patent: Apr. 9, 2019

(54) APPARATUS AND METHOD FOR PROCESSING ANODE PLATE FOR ELECTROLYSIS

(71) Applicant: JIANGXI NERIN EQUIPMENT CO., LTD., Nanchang (CN)

(72) Inventors: Aimin Deng, Nanchang (CN); Zhiyan Yu, Nanchang (CN); Xiaoguang Shao, Nanchang (CN)

(73) Assignee: JIANGXI NERIN EQUIPMENT CO., LTD., Nanchang (CN)

( * ) Notice: Subject to any disclaimer, the term of this patent is extended or adjusted under 35 U.S.C. 154(b) by 166 days.

(21) Appl. No.: 14/368,579

(22) PCT Filed: Oct. 24, 2012

(86) PCT No.: PCT/CN2012/083459
§ 371 (c)(1),
(2) Date: Jun. 25, 2014

(87) PCT Pub. No.: WO2013/097527
PCT Pub. Date: Jul. 4, 2013

(65) Prior Publication Data
US 2014/0331732 A1    Nov. 13, 2014

(30) Foreign Application Priority Data
Dec. 26, 2011 (CN) .......................... 2011 1 0441289

(51) Int. Cl.
*B23C 3/00* (2006.01)
*C25C 7/02* (2006.01)
(Continued)

(52) U.S. Cl.
CPC ................. *B23C 3/00* (2013.01); *B21D 1/00* (2013.01); *B23Q 7/14* (2013.01); *C25C 1/12* (2013.01);
(Continued)

(58) Field of Classification Search
CPC .... C25C 7/02; C25C 1/12; C25C 7/06; C25C 7/00; C25C 1/00; B21D 1/00; B21D 3/16;
(Continued)

(56) References Cited

U.S. PATENT DOCUMENTS 4,184,235 A * 1/1980 Ono .................... B23D 7/08
198/478.1
4,903,520 A * 2/1990 Hukkanen ................ B21D 3/16
204/289
(Continued)

FOREIGN PATENT DOCUMENTS

CN 2637053 Y 9/2004
CN 201241188 Y 5/2009
(Continued)

OTHER PUBLICATIONS

English Translation of JP59133388A is attached.*
(Continued)

*Primary Examiner* — Peter Dungba Vo
*Assistant Examiner* — Joshua D Anderson
(74) *Attorney, Agent, or Firm* — Lathrop Gage LLP

(57) ABSTRACT

An apparatus and method for processing anode plate for electrolysis, the apparatus includes a transverse transmission device (3) for transmitting the anode plate in a transverse direction; a plate-flattening and thickness-measuring device (4) for flattening the anode plate and measuring a thickness of the anode plate; a hanger bottom milling device (6) configured to mill a bottom surface of a hanger of the anode plate, disposed at a first side of the transverse transmission device (3) and positioned downstream of the plate-flattening and thickness-measuring device (4) in the transverse direction; and a hanger side milling device (5) configured to mill a side surface of the hanger of the anode plate, disposed at a second side of the transverse transmission device (3) and
(Continued)

positioned downstream of the plate-flattening and thickness-measuring device (4) in the transverse direction.

9 Claims, 3 Drawing Sheets

(51) Int. Cl.
*B21D 1/00* (2006.01)
*B23Q 7/14* (2006.01)
*C25C 1/12* (2006.01)
*B23P 23/06* (2006.01)

(52) U.S. Cl.
CPC .......... *C25C 7/02* (2013.01); *B23C 2220/28* (2013.01); *B23P 23/06* (2013.01); *B23Q 2717/006* (2013.01); *Y10T 29/49108* (2015.01); *Y10T 29/49204* (2015.01)

(58) Field of Classification Search
CPC ......... B23C 2220/28; B23C 3/00; B23C 3/12; B23P 23/06; B23Q 2717/006; B23Q 7/14; Y10T 29/49204; Y10T 29/49108; G05B 2219/374; B23D 7/08
See application file for complete search history.

(56) References Cited

U.S. PATENT DOCUMENTS

| | | | | |
|---|---|---|---|---|
| 5,799,529 | A * | 9/1998 | Kivisto | B21D 3/16 29/874 |
| 8,227,345 | B2 * | 7/2012 | Matusch | C25C 1/08 205/44 |
| 2006/0089087 | A1 | 4/2006 | Koch | |

FOREIGN PATENT DOCUMENTS

| | | | |
|---|---|---|---|
| CN | 102424981 A | | 4/2012 |
| CN | 202415697 U | | 9/2012 |
| CN | 202607297 U | * | 12/2012 |
| JP | 58-15610 A | | 1/1983 |
| JP | S59173286 A | | 1/1984 |
| JP | S59-67386 A | | 4/1984 |
| JP | 59133388 A | * | 7/1984 |
| JP | S59133387 A | | 7/1984 |
| JP | H01225560 A | | 9/1989 |
| JP | H08-225981 A | | 9/1996 |
| JP | 2000-096280 A | | 4/2000 |
| JP | 2000096280 A | * | 4/2000 |
| JP | 59-133388 A | | 5/2009 |

OTHER PUBLICATIONS

Full translation of JP59133388A is attached.*
JP59133388A to Honma is attached.*
Translation of JP59133388A to Honma is attached.*
Machine translation of CN202607297U to Ding; CN202607297U is attached.*
JP2000096280A is attached.*
Image of milling unit upgrade acquired from internet; [https://www.outotec.com/services/upgrades/anode-milling-unit-upgrade/] acquired [Apr. 26, 2018]; titled 2018-04-26_12-34-25 Anode Milling Unit Upgrade.pdf.*
Email correspondence with sales and technical staff at Outotec confirming availability of side milling unit, see attached Re_Anode Milling Upgrade Outotec.pdf.*
First Office Action of Chilean Patent Application 01537-2014 based on International application No. PCT/CN2012/083459 with search report 17 pages.
Second Office Action of Chilean Patent Application 01537-2014 based on International application No. PCT/CN2012/083459, 7 pages.
Chinese Patent Application No. 201110441289.7 First Office Action dated Jul. 1, 2014, with English translation, 10 pages.
Canadian Patent Application No. 2,856,527 Office Action dated Oct. 26, 2015, 3 pages.
European Patent Application No. 12863215.5 extended Search Report dated Oct. 6, 2015, 4 pages.
PCT/CN2012/083459 International Search Report dated Feb. 7, 2013, 3 pages.

* cited by examiner

APPARATUS AND METHOD FOR PROCESSING ANODE PLATE FOR ELECTROLYSIS

FIELD

Embodiments of the present invention generally relate to a field of copper electrolysis technology, more particularly, to an apparatus and method for processing an anode plate for electrolysis.

BACKGROUND

An anode plate for electrolysis is generally manufactured via casting, thus a deformation and a dimension error of the anode plate are large. In order to improve a drape coefficient and an electrical efficiency in production of the anode plate, and to reduce a short circuit and a contact resistance of the anode plate, the anode plate is needed to process by an anode plate processing apparatus.

The apparatus usually includes an anode receiving-separating-rectifying-weighting device, a plate-flattening and thickness-measuring device, a defective anode plate receiving device, a hanger side milling device, a hanger bottom milling device and an arranging device.

In anode plate processing apparatus in the related art, the hanger side milling device and the hanger bottom milling device are connected (i.e. arranged) in series, namely, the anode plate will be processed by the hanger bottom milling device after passing though the hanger side milling device. Since the milling area of the hanger to be processed by the hanger side milling device is large and a milling feed of the hanger is small, particularly, the anode plate with a large hanger milling thickness is required to mill by the hanger side milling device several times. Thus, a lot of processing time for hanger side milling is needed, causing decreasing of an operation efficiency of the anode plate process apparatus.

U.S. Pat. No 5,799,529 discloses a method for straightening and machining an anode lug. The method includes straightening anode lugs with both vertical and horizontal compression, and smoothing the bottom surface of the anode lug by means of machining. JPS59133388A discloses a method and device for edge working of anode. In addition, Outotec describes a lug side milling unit on its website. Thus, one of ordinary skill in the art would understand what is meant by anode plate hanger bottom and side surfaces in the related art. As illustrated in FIG. 3, the side surface of the hanger refers to a surface of the hanger that is perpendicular to a thickness direction of the anode plate, the anode plate is generally suspended vertically through its hangers, and the bottom surface of the hanger refers to the lower surface of the hanger when the anode plate is suspended vertically.

SUMMARY

Embodiments of the present invention seek to solve at least one of the problems existing in the related art to at least some extent.

An apparatus for processing an anode plate for electrolysis according to embodiments of a first broad aspect of the present invention, includes: a transverse transmission device for transmitting the anode plate in a transverse direction; a plate-flattening and thickness-measuring device for flattening the anode plate being transmitted on the transverse transmission device and measuring a thickness of the anode plate being transmitted on the transverse transmission device; a hanger bottom milling device configured to mill a bottom surface of a hanger of the anode plate, disposed at a first side of the transverse transmission device and positioned downstream of the plate-flattening and thickness-measuring device in the transverse direction; and a hanger side milling device configured to mill a side surface of the hanger of the anode plate, disposed at a second side of the transverse transmission device and positioned downstream of the plate-flattening and thickness-measuring device in the transverse direction.

With disposing the hanger bottom milling device and the hanger side milling device at a first side and a second side of the transverse transmission device respectively, when it is not needed to mill the side surface of the hanger of the anode plate flattened and measured by the plate-flattening and thickness-measuring device, the anode plate can be directly transmitted to the hanger bottom milling device to mill the bottom surface of the hanger. When the anode plate flattened and measured by the plate-flattening and thickness-measuring device is needed to mill the side surface of the hanger, the anode plate is transmitted to the hanger side milling device to mill the side surface of the hanger, and then the anode plate is transmitted to the hanger bottom milling device to mill the bottom surface of the hanger. In other words, the hanger side milling device and the hanger bottom milling device are connected (i.e. arranged) in parallel, and operate independently from each other, thus the operation of the hanger side milling device will not affect the operations of the hanger bottom milling device and the whole apparatus, thus improving the operation efficiency of the apparatus.

In some embodiments, the hanger bottom milling device is opposite the hanger side milling device in a direction perpendicular to the transverse direction.

In some embodiments, the apparatus further includes a plate receiving device configured to receive the anode plate, and a conveying-separating-rectifying-weighting assembly device configured for chain-conveying the received anode plates, separating the received anode plates, vertically rectifying the hangers of the anode plates and weighting the received anode plates, the plate receiving device and the conveying-separating-rectifying-weighting assembly device being arranged in series and disposed upstream of the plate-flattening and thickness-measuring device in the transverse direction.

In some embodiments, the plate receiving device and the conveying-separating-rectifying-weighting assembly device are disposed at the second side of the transverse transmission device and adjacent to an upstream end of the transverse transmission device.

In some embodiments, the apparatus further includes a defective anode plate collecting device configured to remove and collect a defective anode plate and disposed downstream of the hanger bottom milling device and the hanger side milling device.

In some embodiments, the defective anode plate collecting device is disposed at the second side of the transverse transmission device and adjacent to a downstream end of the transverse transmission device.

In some embodiments, the apparatus further includes a lifting device and an anode plate conveying-arranging device which are disposed downstream of the first milling device in turn in the direction perpendicular to the transverse direction.

The method for processing an anode plate for electrolysis according to embodiments of a second broad aspect of the present invention, includes: transmitting the anode plate in a transverse direction via a transverse transmission device; flattening the anode plate and measuring a thickness of the anode plate during transmitting the anode plate in the transverse direction; judging whether the flattened and measured anode plate being needed to mill a side surface of the hanger by a hanger side milling device; milling a bottom surface of the hanger of the flattened and measured anode plate by a hanger bottom milling device if the flattened and measured anode plate is not needed to mill the side surface of the hanger; and milling the side surface of the hanger of the flattened and measured anode plate by the hanger side milling device, and then milling the bottom surface of the hanger by the hanger bottom milling device if the flattened and measured anode plate is needed to mill the side surface of the hanger.

The method for processing an anode plate for electrolysis according to embodiments of the present invention, can improve operation efficiency.

In some embodiments, the method further includes judging whether the flattened and measured anode plate being qualified before judging whether the side surface of the hanger of the flattened and measured anode plate is needed to mill by the hanger side milling device, and removing and collecting a defective anode plate if the flattened and measured anode plate is defective.

In some embodiments of the present invention, the method further includes arranging the anode plate with the bottom surface of the hanger being milled via a lifting device and an anode plate conveying-arranging device.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
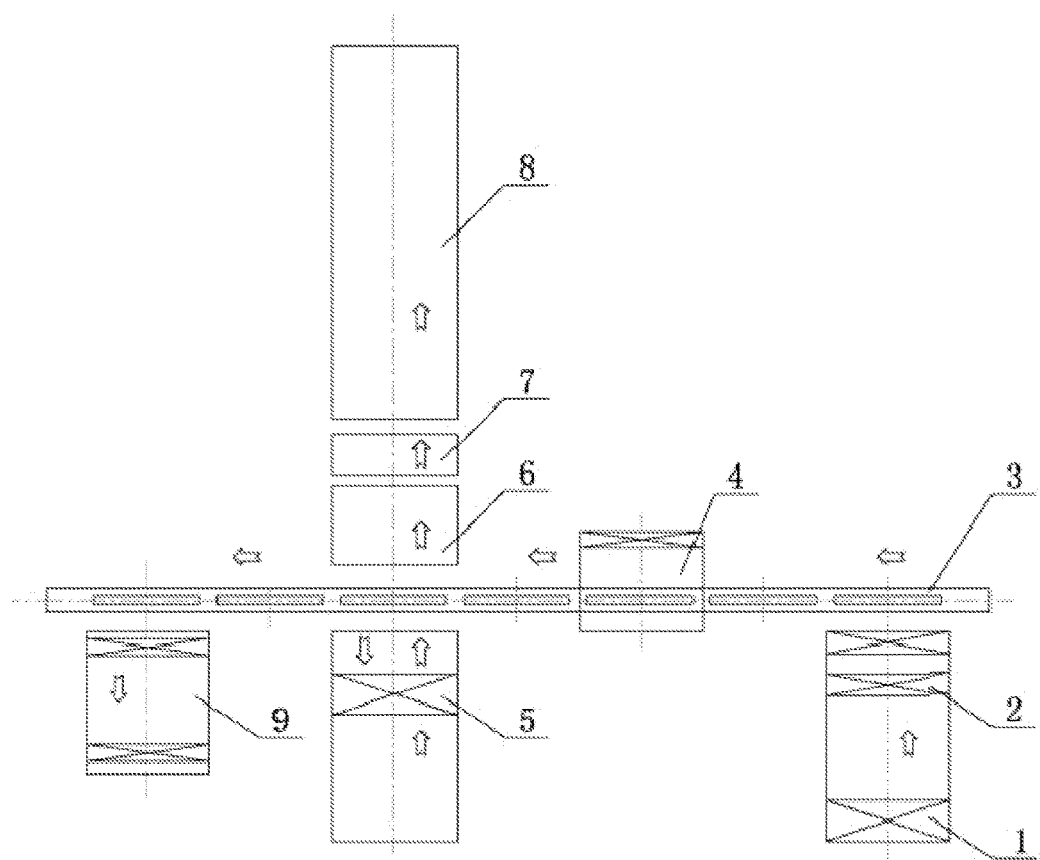
FIG. 1 is a schematic top view of an apparatus for processing an anode plate for electrolysis according to an embodiment of the present invention.

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

In the specification, unless specified or limited otherwise, relative terms such as "central", "longitudinal", "side", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present invention be constructed or operated in a particular orientation.

FIG. 1 is a schematic view of an apparatus for processing an anode plate for electrolysis according to an embodiment of the present invention. As shown in FIG. 1, directions of hollow arrows indicate transmitting directions of the anode plate. The apparatus for processing an anode plate for electrolysis according to embodiments of the present invention includes a transverse transmission device 3, a plate-flattening and thickness-measuring device 4, a hanger side milling device 5 and a hanger bottom milling device 6.

Specifically, the transverse transmission device 3 transmits the anode plate in a transverse direction (the left-right direction in FIG. 1), from upstream to downstream. During transmitting, the respective devices of the apparatus except for the transverse transmission device 3 can correspondingly process or machine the anode plate.

Here, the transverse direction is the left right direction in the FIG. 1, and the transverse transmission device 3 can transmit the anode plate in the left-right direction in FIG. 1, in which the right side is the upstream side of the apparatus and the left side is the downstream side of the apparatus.

The plate-flattening and thickness-measuring device 4 is used to flatten the anode plate and to measure a thickness of the anode plate when the anode plate is being transmitted on the transverse transmission device 3. In other words, when the anode plate on the transverse transmission device 3 is transmitted to the plate-flattening and thickness-measuring device 4, the plate-flattening and thickness-measuring device 4 can flatten the anode plate and measure the thickness of the anode plate.

The hanger bottom milling device 6 is used to mill a bottom surface of the hanger of the anode plate. The hanger bottom milling device 6 may be disposed at a first side of the transverse transmission device 3 (for example, an upper side of the transverse transmission device 3 in FIG. 1) and positioned downstream of the plate-flattening and thickness-measuring device 4 in the transverse direction. Thus, the bottom surface of the hanger of the anode plate may be milled after the anode plate is processed by the plate-flattening and thickness-measuring device 4.

The hanger side milling device 5 is used to mill a side surface of the hanger of the anode plate. It should be noted that the side surface of the hanger is a surface of the hanger that is perpendicular to a thickness direction of the anode plate. The hanger side milling device 5 may be disposed at a second side of the transverse transmission device 3 (for example, a lower side of the transverse transmission device 3) and positioned downstream of the plate-flattening and thickness-measuring device 4 in the transverse direction. Thus, the side surface of the hanger of the anode plate may be milled after the anode plate is processed by the plate-flattening and thickness-measuring device 4.

With the apparatus for processing an anode plate for electrolysis according embodiments of the present invention, the anode plate flattened and measured by the plate-flattening and thickness-measuring device 4 can be transmitted to the hanger side milling device 5 or the hanger bottom milling device 6 selectively.

For example, a first anode plate is transmitted to the hanger side milling device 5 to mill the side surface of the hanger of the first anode plate, a second anode plate next to the first anode plate may be directly transmitted to the hanger bottom milling device 6 to mill the bottom surface of the hanger thereof, if the second anode plate is not needed to mill the side surface of the hanger thereof. Thus, the operation of the hanger side milling device 5 will not affect the operation of the hanger bottom milling device 6.

The first anode plate with the side surface of the hanger being milled is transmitted to the hanger bottom milling device 6 to mill the bottom surface of the hanger, and the flattened and measured anode plate which is not needed to mill the side surface of the hanger thereof, can be directly transmitted to the hanger bottom milling device 6 to mill the bottom surface of the hanger. Generally, the side surface of the hanger is milled for several times, so that the milling of the surface of the hanger needs more time. With the apparatus of the embodiments of the present invention, the milling of the side surface of the hanger will not affect the milling of the bottom surface of the hanger, thus, the operation efficiency of the apparatus is improved.

With disposing the hanger bottom milling device 6 and the hanger side milling device 5 at the first side and the second side of the transverse transmission device 3 respectively, when the flattened and measured anode plate is not needed to mill the side surface of the hanger, the flattened and measured anode plate can be directly transmitted to the hanger bottom milling device 6 to mill the bottom surface of the hanger. When the flattened and measured anode plate is needed to mill the side surface of the hanger, the flattened and measured anode plate will be transmitted to the hanger side milling device 5 to mill the side surface of the hanger first, after milling the side surface of the hanger, the anode plate is transmitted to the hanger bottom milling device 6 to mill the bottom surface of the hanger. In other words, the hanger side milling device 5 and the hanger bottom milling device 6 are arranged in parallel, and operate independently of each other. The operation of the hanger side milling device 5 will not affect the operations of the hanger bottom milling device 6 and the whole apparatus, thus the operation efficiency of the apparatus is improved.

In some embodiments, as shown in FIG. 1, the hanger bottom milling device 6 is opposite to the hanger side milling device 5 in a direction perpendicular to the transverse direction. Thus, it is convenient to transmit the anode plate with the side surface milled to the hanger bottom milling device 6 from the hanger side milling device 5, thus the operation efficiency is further improved.

In some embodiments, the apparatus may further include a plate receiving device 1 used to receive the anode plate, and a conveying-separating-rectifying-weighting assembly device 2 for chain-conveying, the received anode plates, separating the received anode plates, vertically rectifying the hangers of the anode plates and weighting the received anode plates.

The plate receiving device 1 and the conveying-separating-rectifying-weighting assembly device 2 are arranged in series and disposed upstream of the plate-flattening and thickness-measuring device 4 in the transverse direction, as shown in FIG. 1. Thus, the anode plate can be processed initially, then transmitted to the transverse transmission device 3 piece by piece, which facilitates the further processing of the anode plate.

Moreover, the plate receiving device 1 and the conveying-separating-rectifying-weighting assembly device 2 are disposed at the second side of the transverse transmission device 3 and adjacent to an upstream end of the transverse transmission device 3. Thus, the plate receiving device 1, the conveying-separating-rectifying-weighting assembly device 2 and the hanger side milling device 5 are disposed at the same side of the transverse transmission 3 so as to provide a sufficient operation space for the apparatus at the first side.

In some embodiments, as shown in FIG. 1, the apparatus may further include a defective anode plate collecting device 9 which is used to remove and collect a defective anode plate and is disposed downstream of the hanger bottom milling device 6 and the hanger side milling device 5. Thus, the defective anode plate selected by the plate-flattening and thickness-measuring device 4 can be collected by the defective anode plate collecting device 9 and then removed from the apparatus.

Alternately, the defective anode plate collecting device 9 may be disposed at the second side of the transverse transmission device 3 and adjacent to a downstream end of the transverse transmission device 3, thus providing the sufficient operation space for the apparatus at the first side.

In some embodiments, as shown in FIG. 1, the apparatus may further include a lifting device 7 and an anode plate conveying-arranging device 8 which are disposed downstream of the hanger bottom milling device 6 in turn in the direction perpendicular to the transverse direction. Thus, the anode plate, whose the bottom surface of the hanger is milled by the hanger bottom milling device 6, can be arranged and transmitted out of the apparatus.

Alternately, the lifting device 7 and the anode plate conveying-arranging device 8 may be disposed at the first side of the transverse transmission device 3, thus facilitating the operating the processed anode plate.

Other components and operations of the apparatus for processing an anode plate for electrolysis according to embodiments of the present invention may be commonly known by those skilled in the art, detailed descriptions thereof are omitted herein.

An operation of the apparatus for processing an anode plate for electrolysis will be described with reference to FIG. 1.

Firstly, the anode plate to be processed is separated and weighted by the plate receiving device 1 and the conveying-separating-rectifying-weighting assembly device 2, and the hangers of the anode plate is vertically rectified by the conveying-separating-rectifying-weighting assembly device 2, then the anode plate is transmitted onto the transverse transmission device 3.

Next, the anode plate is transmitted to the plate-flattening and thickness measuring device 4 by the transverse transmission device 3, the anode plate is flatten and a thickness of the anode plate is measured by the plate-flattening and thickness measuring device 4, so as to classify the anode plates into three types according to the thicknesses of the anode plates.

The three types of the anode plates are the defective anode plate, the anode plate being not needed to mill the side surface of the hanger and the anode plate being needed to mill the side surface of the hanger.

After the classification, the defective anode plates are transmitted to the detective anode plate collecting device 9 and removed from the apparatus; the anode plate being not needed to mill the side surface of the hanger is transmitted to the hanger bottom milling device 6 directly to mill the bottom surface of the hanger; the anode plate being needed to mill the side surface of the hanger is transmitted to the hanger side milling device 5 to mill the side surface of the hanger, after the milling of the side surface of the hanger, the anode plate is transmitted to the hanger bottom milling device 6 to mill the bottom surface of the hanger.

Finally, after the milling of the bottom surface of the hanger, the anode plate is arranged and transmitted out of the apparatus by the lifting device 7 and the anode plate conveying-arranging device 8.

Figure 2:
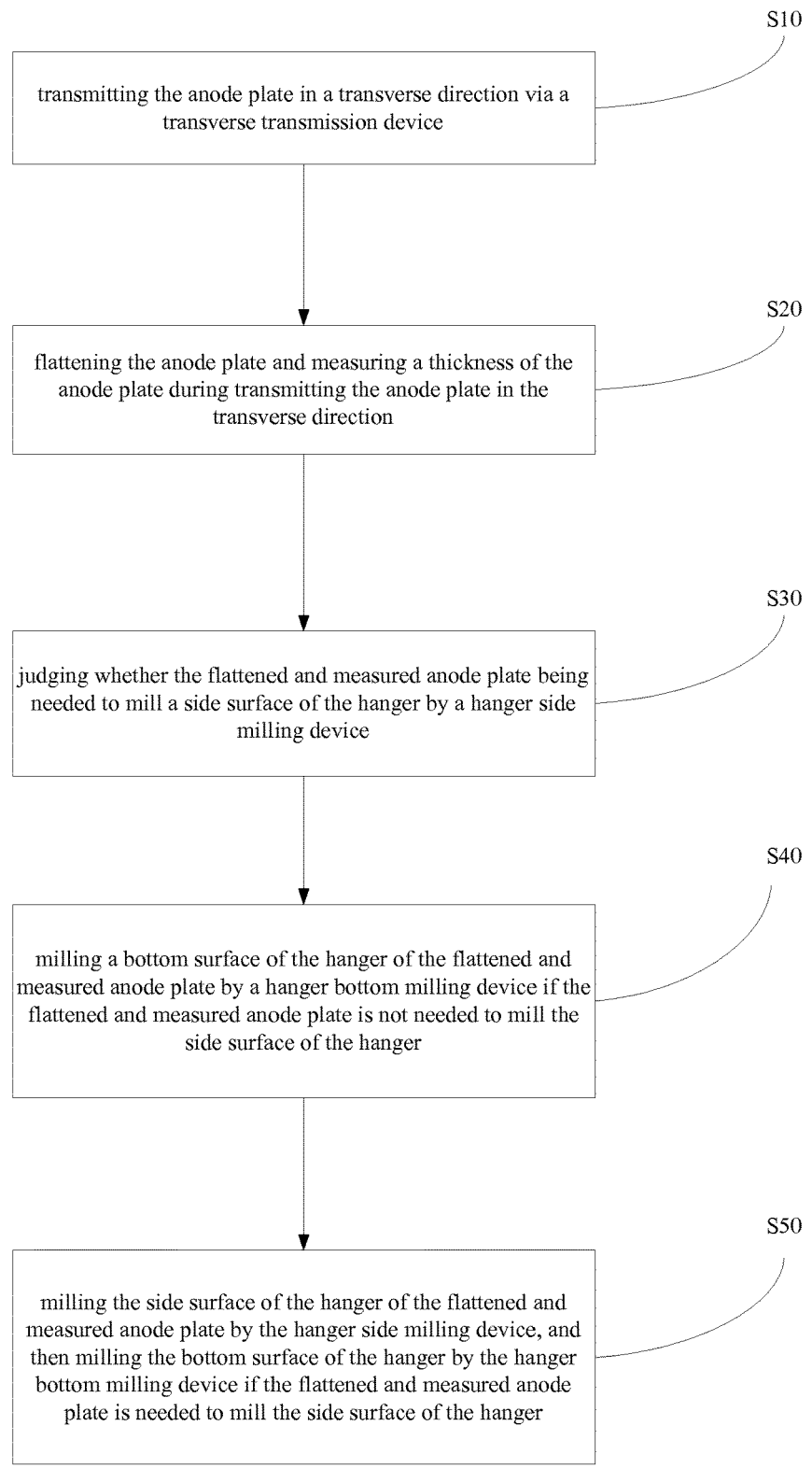
FIG. 2 is a flow chart of a method for processing an anode plate for electrolysis according to an embodiment of the present invention.
Figure 3:
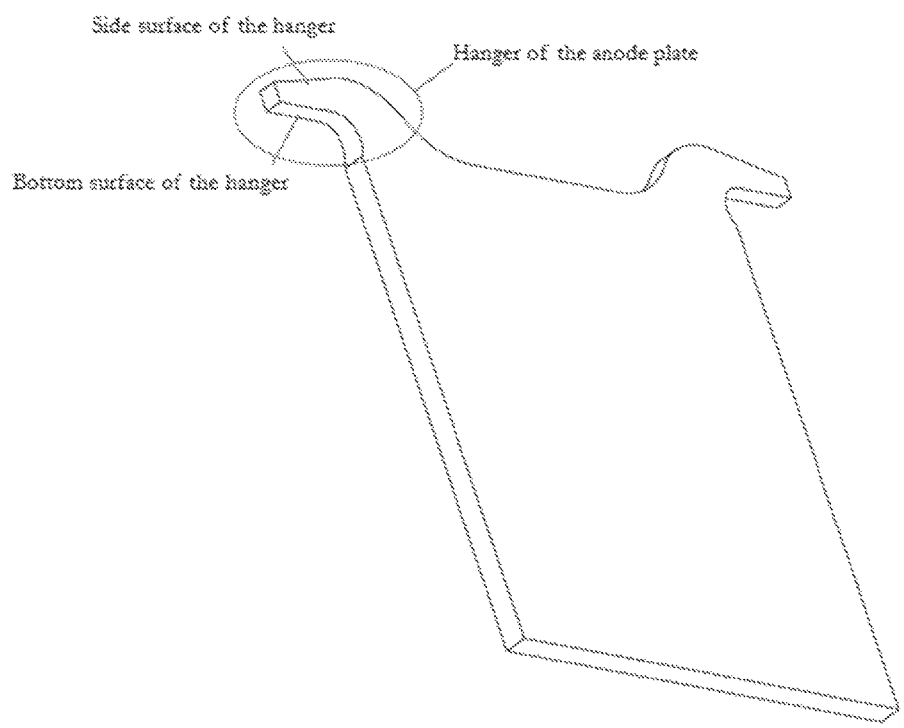
FIG. 3 is a schematic view of a conventional anode plate.

FIG. 2 is a flow chart of a method for processing an anode plate for electrolysis according to an embodiment of the present invention. The method for processing an anode plate for electrolysis according to embodiments of the present invention includes:

Step S10, transmitting an anode plate in a transverse direction via a transverse transmission device 3.

Step S20, flattening the anode plate and measuring a thickness of the anode plate during transmitting the anode plate in the transverse direction.

Step S30, judging whether the flattened and measured anode plate being needed to mill a side surface of the hanger by a hanger side milling device 5.

Step S40, milling a bottom surface of the hanger of the flattened and measured anode plate by a hanger bottom milling device 6 if the flattened and measured anode plate is not needed to mill the side surface of the hanger.

Step S50, milling the side surface of the hanger of the flattened and measured anode plate by the hanger side milling device 5, and then milling the bottom surface of the hanger by the hanger bottom milling device 6, if the flattened and measured anode plate is needed to mill the side surface of the hanger.

With the method according to embodiments of the present invention, the operation of the hanger side milling device 5 cannot affect the operations of the hanger bottom milling device 6 and the whole apparatus, thus the operation efficiency of the apparatus is improved.

In some embodiments, the method further includes the step of judging whether the flattened and measured anode plate being qualified before judging whether the side surface of the hanger of the flattened and measured anode plate is needed to mill by the hanger side milling device 5, and removing and collecting the defective anode plate if the flattened and measured anode plate is defective. Thus, the detective anode plates and the qualified anode plates can be distinguished and transmitted respectively, and the rate qualify of the anode plate can be improved.

In some embodiments, the method further includes the step of arranging the anode plate with the bottom surface of the hanger being milled via a lifting device and an anode plate conveying-arranging device, thus facilitating the succeeding processes of the processed anode plate.

The method according to embodiments of the present invention can dreamily improve processing efficiency of the anode plate. And other procedures and steps in the method are commonly known by those skilled in the art, which are omitted herein.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. An apparatus for processing an anode plate for electrolysis, comprising:
   a transverse transmission device for transmitting the anode plate in a transverse direction;
   a plate-flattening and thickness-measuring device for flattening the anode plate being transmitted on the transverse transmission device and measuring a thickness of the anode plate being transmitted on the transverse transmission device;
   a hanger bottom milling device configured to mill a bottom surface of a hanger of the anode plate being transmitted on the transverse transmission device, the hanger bottom milling device being positioned downstream of the plate-flattening and thickness-measuring device in the transverse direction, and
   a hanger side milling device configured to mill a side surface of the hanger of the anode plate being transmitted on the transverse transmission device, the hanger side milling device being positioned downstream of the plate-flattening and thickness-measuring device in the transverse direction,
   wherein the transverse transmission device is disposed between the hanger bottom milling device and the hanger side milling device in a direction perpendicular to the transverse direction,
   wherein the apparatus further comprises a defective anode plate collecting device configured to remove and collect a defective anode plate and disposed downstream of the hanger bottom milling device and the hanger side milling device.

2. The apparatus according to claim 1, wherein the hanger bottom milling device is opposite the hanger side milling device in a direction perpendicular to the transverse direction.

3. The apparatus according to claim 1, further comprising a plate receiving device configured to receive the anode plate, and a conveying-separating-rectifying-weighting assembly device configured for chain-conveying the received anode plates, separating the received anode plates, vertically rectifying the hangers of the anode plates and weighting the received anode plates, the plate receiving device and the conveying-separating-rectifying-weighting assembly device being arranged in series and disposed upstream of the plate-flattening and thickness-measuring device in the transverse direction.

4. The apparatus according to claim 3, wherein the plate receiving device and the conveying-separating-rectifying-weighting assembly device are disposed at a same side of the transverse transmission device as the hanger side milling device, and wherein the plate receiving device and the conveying-separating-rectifying-weighting assembly device are disposed adjacent to an upstream end of the transverse transmission device.

5. The apparatus according claim 1, wherein the defective anode plate collecting device is disposed at a same side of the transverse transmission device as the hanger side milling device, and wherein the defective anode plate collecting device is disposed adjacent to a downstream end of the transverse transmission device.

6. The apparatus according claim 1, further comprising a lifting device and an anode plate conveying-arranging device which are disposed downstream of the hanger bottom milling device in turn in the direction perpendicular to the transverse direction.

7. A method for processing an anode plate for electrolysis, comprising steps of:
   transmitting the anode plate in a transverse direction via a transverse transmission device;
   flattening the anode plate and measuring a thickness of the anode plate during transmitting the anode plate in the transverse direction via a plate-flattening and thickness measuring device:
   judging whether a side surface of a hanger of the flattened and measured anode plate needs to be milled by a hanger side milling device:
   milling a bottom surface of the hanger of the flattened and measured anode plate by a hanger bottom milling device if the side surface of the hanger of the flattened and measured anode plate does not need to be milled;

milling the side surface of the hanger of the flattened and measured anode plate by the hanger side milling device, and then milling the bottom surface of the hanger by the hanger bottom milling device, if the side surface of the hanger of the flattened and measured anode plate does need to be milled; and judging whether the flattened and measured anode plate is defective before judging whether the side surface of the hanger of the flattened and measured anode plate needs to be milled, and removing and collecting a defective anode plate if the flattened and measured anode plate is defective.

8. The method for machining an anode plate for electrolysis according to claim 7, further comprising arranging the anode plate with the bottom surface of the hanger being milled via a lifting device and an anode plate conveying-arranging device.

9. An apparatus for processing an anode plate for electrolysis, comprising:
   a transverse transmission device for transmitting the anode plate in a transverse direction;
   a plate-flattening and thickness-measuring device for flattening the anode plate being transmitted on the transverse transmission device and measuring a thickness of the anode plate being transmitted on the transverse transmission device;
   a hanger bottom milling device configured to mill a bottom surface of a hanger of the anode plate being transmitted on the transverse transmission device, the hanger bottom milling device being positioned downstream of the plate-flattening and thickness-measuring device in the transverse direction; and
   a hanger side milling device configured to mill a side surface of the hanger of the anode plate being transmitted on the transverse transmission device, the hanger side milling device being positioned downstream of the plate-flattening and thickness-measuring device in the transverse direction,
   wherein the transverse transmission device is disposed between the hanger bottom milling device and the hanger side milling device in a direction perpendicular to the transverse direction,
   wherein the hanger bottom milling device is opposite the hanger side milling device in a direction perpendicular to the transverse direction;
   a plate receiving device configured to receive the anode plate, and a conveying-separating-rectifying-weighting assembly device configured for chain-conveying the received anode plates, separating the received anode plates, vertically rectifying the hangers of the anode plates and weighting the received anode plates, the plate receiving device and the conveying-separating-rectifying-weighting assembly device being arranged in series and disposed upstream of the plate-flattening and thickness-measuring device in the transverse direction,
   wherein the plate receiving device and the conveying-separating-rectifying-weighting assembly device are disposed at a same side of the transverse transmission device as the hanger side milling device, and wherein the plate receiving device and the conveying-separating-rectifying-weighting assembly device are disposed adjacent to an upstream end of the transverse transmission device;
   a defective anode plate collecting device configured to remove and collect a defective anode plate and disposed downstream of the hanger bottom milling device and the hanger side milling device,
   wherein the defective anode plate collecting device is disposed at the same side of the transverse transmission device as the hanger side milling device, and wherein the defective anode plate collecting device is disposed adjacent to a downstream end of the transverse transmission device; and
   a lifting device and an anode plate conveying-arranging device which are disposed downstream of the hanger bottom milling device in turn in the direction perpendicular to the transverse direction.

* * * * *